United States Patent
Miyamoto et al.

(10) Patent No.: US 9,811,149 B2
(45) Date of Patent: Nov. 7, 2017

(54) INFORMATION PROCESSING APPARATUS, NON-TRANSITORY COMPUTER READABLE MEDIUM, AND INFORMATION PROCESSING METHOD

(71) Applicant: FUJI XEROX CO., LTD., Tokyo (JP)

(72) Inventors: Shotaro Miyamoto, Kanagawa (JP); Takumi Kawahara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 160 days.

(21) Appl. No.: 14/656,415

(22) Filed: Mar. 12, 2015

(65) Prior Publication Data
US 2015/0323985 A1 Nov. 12, 2015

(30) Foreign Application Priority Data
May 8, 2014 (JP) ................................ 2014-096897

(51) Int. Cl.
| | |
|---|---|
| *G06F 1/00* | (2006.01) |
| *G06F 1/26* | (2006.01) |
| *G06F 1/32* | (2006.01) |
| *G06F 12/084* | (2016.01) |
| *G06F 12/08* | (2016.01) |

(52) U.S. Cl.
CPC .......... *G06F 1/3287* (2013.01); *G06F 1/3206* (2013.01); *G06F 1/3284* (2013.01); *G06F 1/3296* (2013.01); *G06F 12/08* (2013.01); *G06F 12/084* (2013.01); *G06F 2212/281* (2013.01); *Y02B 60/1267* (2013.01); *Y02B 60/1282* (2013.01)

(58) Field of Classification Search
CPC .... G06F 1/3206; G06F 1/3284; G06F 1/3287; G06F 1/3296; G06F 12/08; G06F 12/084; G06F 2212/281; Y02B 60/1267; Y02B 60/1282
See application file for complete search history.

(56) References Cited

U.S. PATENT DOCUMENTS

| | | | | |
|---|---|---|---|---|
| 6,501,999 | B1 * | 12/2002 | Cai ...................... | G06F 1/3203 700/82 |
| 7,793,126 | B2 * | 9/2010 | McGrane .................. | G06F 1/26 713/300 |
| 2001/0056456 | A1 * | 12/2001 | Cota-Robles ......... | G06F 9/4843 718/103 |
| 2009/0271797 | A1 | 10/2009 | Nishikawa | |

FOREIGN PATENT DOCUMENTS

| | | |
|---|---|---|
| JP | 2009265926 A | 11/2009 |
| JP | 2010-161797 A | 7/2010 |

* cited by examiner

*Primary Examiner* — Mark Connolly
(74) *Attorney, Agent, or Firm* — Oliff PLC (57) ABSTRACT

An information processing apparatus includes a first controller, a second controller, and a shared memory. The first controller outputs a transition signal that indicates a transition to a power-saving mode in which power consumption is reduced compared to a normal mode. The second controller outputs instruction information that indicates an instruction provided from the first controller before the transition signal is output on the basis of the transition signal output from the first controller. The shared memory is connected to the first controller and the second controller to be shared, and stores the instruction information output from the second controller even after a transition is made to the power-saving mode.

6 Claims, 5 Drawing Sheets

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2014-096897 filed May 8, 2014.

BACKGROUND

Technical Field

The present invention relates to an information processing apparatus, a non-transitory computer readable medium, and an information processing method.

SUMMARY

According to an aspect of the present invention, there is provided an information processing apparatus including: a first controller that outputs a transition signal that indicates a transition to a power-saving mode in which power consumption is reduced compared to a normal mode; a second controller that outputs instruction information that indicates an instruction provided from the first controller before the transition signal is output on a basis of the transition signal output from the first controller; and a shared memory that is connected to the first controller and the second controller to be shared and that stores the instruction information output from the second controller even after a transition is made to the power-saving mode.

BRIEF DESCRIPTION OF THE DRAWINGS

An exemplary embodiment of the present invention will be described in detail based on the following figures, wherein.

DETAILED DESCRIPTION

[Exemplary Embodiment]
(Overall Configuration of Information Processing Apparatus 1)

Figure 1:
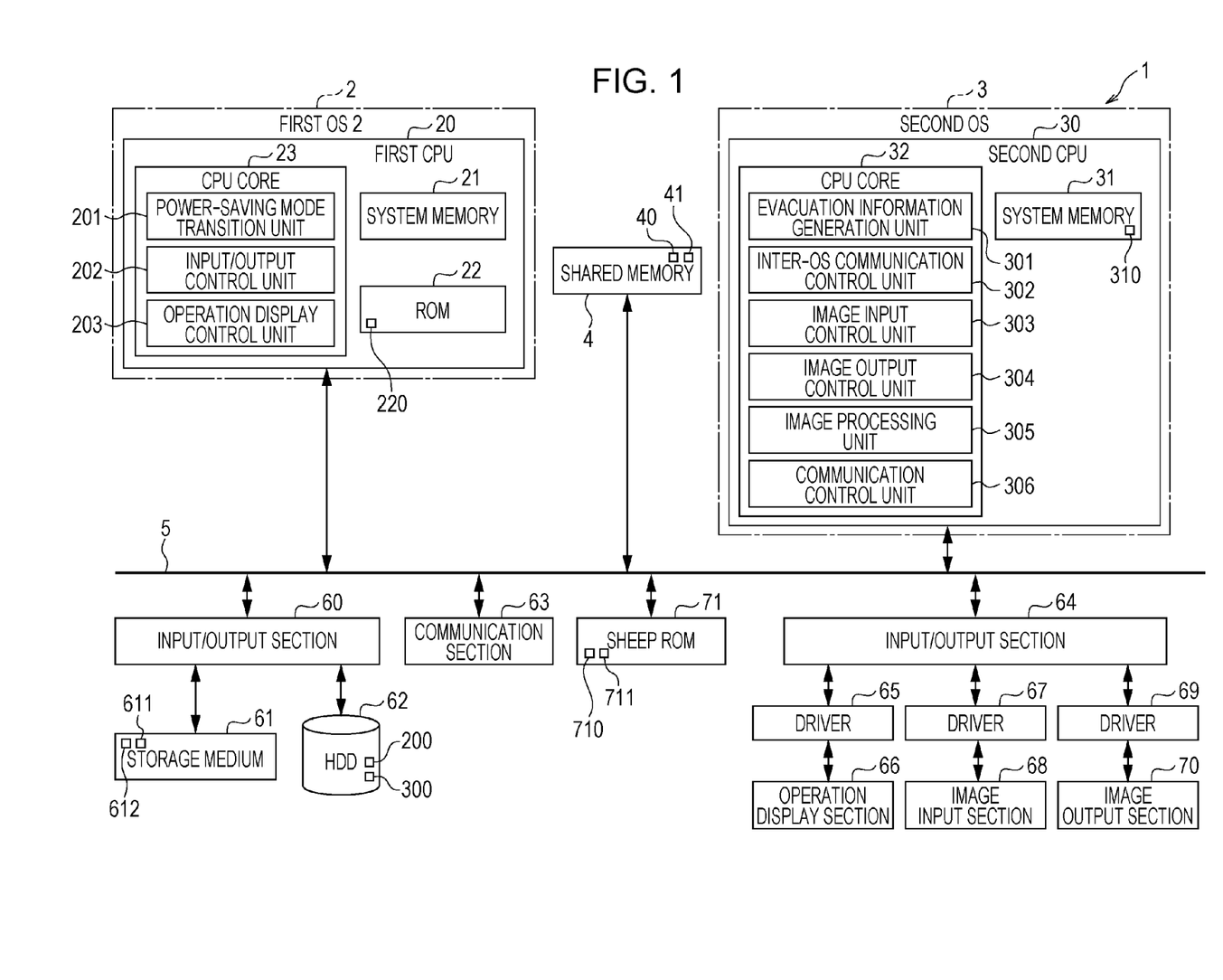
FIG. 1 is a block diagram illustrating an example of the configuration of an information processing apparatus according to an exemplary embodiment of the present invention.

FIG. 1 is a block diagram illustrating an example of the configuration of an information processing apparatus according to an exemplary embodiment of the present invention. An information processing apparatus 1 is a loosely-coupled multi-processor system in which a first CPU 20 and a second CPU 30 that operate on the basis of different operating systems (OSs) are connected to each other via a system bus 5, for example.

The different operating systems described above are a first OS 2 and a second OS 3. The first OS 2 is an OS with low real-time property compared to the second OS 3. The first OS 2 is an OS based on the Linux (registered trademark) architecture, for example. The second OS 3 is an OS based on the ARM (registered trademark) architecture, for example.

The system bus 5 is a common path that allows the first CPU 20, the second CPU 30, and so forth to exchange a signal, information, and so forth. A shared memory 4 that is accessible by the first CPU 20 and the second CPU 30 is connected to the system bus 5. A storage medium 61 and a hard disk drive (HDD) 62 that serves as an example of the storage unit are connected to the system bus 5 via an input/output section 60 on the first CPU 20 side. In addition, various drivers 65, 67, and 69 are connected to the system bus 5 via an input/output section 64 on the second CPU 30 side. An operation display section 66, an image input section 68, and an image output section 70 are connected to the drivers 65, 67, and 69, respectively. Further, a communication section 63 for connection of the information processing apparatus 1 to a local area network (LAN) or the like and a sheep ROM (read only memory) 71 are connected to the system bus 5.

The information processing apparatus 1 is an image forming device that includes a scanner function for optically reading a document, a printer function and a copying function for forming an image on paper for printing, a storage function for storing image data on a read document in a storage medium, a transmission function for transmitting the image data to an electronic device electromagnetically connected via a network, and so forth, for example. The electromagnetic connection refers to a connection that uses at least one of a connection through a conductor, a connection through light which is a type of electromagnetic waves, and a connection through radio waves which are a type of the electromagnetic waves.

As illustrated in FIG. 1, the information processing apparatus 1 roughly includes the first CPU 20 which outputs a power-saving mode request command that indicates a transition to a power-saving mode in which power consumption is reduced compared to a normal mode, the second CPU 30 which outputs evacuation information 41 that indicates an instruction provided from the first CPU 20 before the power-saving mode request command is output on the basis of the power-saving mode request command output from the first CPU 20, and the shared memory 4 which is connected to the first CPU 20 and the second CPU 30 to be shared and which stores the evacuation information 41 output from the second CPU 30 even after a transition is made to the power-saving mode. The first CPU 20, the second CPU 30, and the shared memory 4 are each an example of the first control unit, the second control unit, and the shared storage unit, respectively. In addition, the power-saving mode request command and the evacuation information 41 are each an example of the transition signal and the instruction information, respectively.

The storage medium 61 is a non-volatile semiconductor memory, for example. The storage medium 61 stores a first OS image 611, a second OS image 612, and so forth.

The HDD 62 is a non-volatile mass storage device. The HDD 62 stores state information 40 stored in the shared memory 4 on the basis of an instruction from the first CPU 20 and the evacuation information 41 during the power-saving mode, for example. The HDD 62 stores an application 200 that controls operation of the first CPU 20, and an application 300 that controls operation of the second CPU 30. The applications 200 and 300 are examples of an information processing program.

The sheep ROM 71 is a non-volatile semiconductor memory, for example. The sheep ROM 71 stores boot information 710 and product information 711. The boot information 710 is information for setting of the entire information processing apparatus 1, and includes information indicating whether or not a transition has been made to the power-saving mode, for example. The product information 711 is information including setting of an operation clock etc., for example.

(Configuration of First CPU 20)

The first CPU 20 is a processor that computes, processes, etc. acquired data in accordance with the first OS 2 as illustrated in FIG. 1. The first CPU 20 includes a system memory 21, a ROM 22, and a CPU core 23. The first OS 2 is software started by expanding the first OS image 611 stored in the storage medium 61 in the system memory 21, for example. The application 200 stored in the HDD 62 is expanded in the system memory 21 by starting the first OS 2, for example.

The CPU core 23 operates in accordance with the application 200 to function as a power-saving mode transition unit 201, an input/output control unit 202, an operation display control unit 203, and so forth.

The power-saving mode transition unit 201 performs a process for transitioning to the power-saving mode in the case where the information processing apparatus 1 is instructed to transition from the normal mode to the power-saving mode. The power-saving mode transition unit 201 generates a power-saving mode request command to output the power-saving mode request command to the second CPU 30.

In addition, the power-saving mode transition unit 201 stores the state information 40 and the evacuation information 41 stored in the shared memory 4 in the HDD 62 via the system bus 5 and the input/output section 60 in order for a transition to the power-saving mode. The state information 40 is information such as setting of the information processing apparatus 1 before a transition is made to the power-saving mode, and includes the boot information 710 and the product information 711 stored in the sheep ROM 71, for example.

The input/output control unit 202 controls the input/output section 60 and the input/output section 64. The input/output control unit 202 achieves a storage function by controlling the storage medium 61 and the HDD 62 via the input/output section 60.

The operation display control unit 203 provides an instruction to the second CPU 30 to control the operation display section 66 via the driver 65. In the operation display section 66, a touch sensor that serves as an input unit that receives input from an operator is disposed in an overlapping manner on a monitor that serves as a display unit that displays an image such as a menu, for example. A transition to the power-saving mode and a cancellation of the power-saving mode are performed through an operation performed on the operation display section 66, for example.

In addition, the first CPU 20 includes the system memory 21 and the ROM 22.

The system memory 21 is a volatile semiconductor memory. The system memory 21 is a random access memory (RAM) to which data may be written and from which data may be read, and is used as a storage region in which a computation result or the like is temporarily stored.

The ROM 22 is a non-volatile semiconductor memory. A bootloader 220 is stored in the ROM 22, for example. The bootloader 220 is basic software for starting the first OS 2 and the second OS 3.

When the information processing apparatus 1 is turned on, the first CPU 20 reads the first OS image 611 and the second OS image 612 from the storage medium 61 on the basis of the bootloader 220 stored in the ROM 22, and reads the boot information 710 and the product information 711 stored in the sheep ROM 71. The first CPU 20 expands the first OS image 611 in the system memory 21 and expands the second OS image 612 in the shared memory 4 to start the first OS 2 and the second OS 3 on the basis of the first OS image 611, the second OS image 612, the boot information 710, and the product information 711 which have been read.

(Configuration of Second CPU 30)

The second CPU 30 is a processor that computes, processes, etc. acquired data in accordance with the second OS 3 as illustrated in FIG. 1. The second CPU 30 includes a system memory 31 and a CPU core 32. The second OS 2 is software started by expanding the second OS image 612 stored in the storage medium 61 in the shared memory 4, for example. The application 300 stored in the HDD 62 is expanded in the system memory 31 by starting the second OS 3, for example.

The second CPU 30 consumes a reduced amount of power compared to the first CPU 20 during the power-saving mode. In the exemplary embodiment, supply of power to the second CPU 30 is stopped during the power-saving mode.

The second CPU 30 includes the system memory 31. The system memory 31 is a volatile semiconductor memory. The system memory 31 is a RAM to which data may be written and from which data may be read, and is used as a storage region in which a computation result or the like is temporarily stored.

The system memory 31 stores registered command information 310. The registered command information 310 is a command provided from the first CPU 20, for example. The command provided from the first CPU 20 includes a command with a high order of priority.

Examples of the command with a high order of priority include an emergency reception command registration command. The emergency reception command registration command is a command for registering an emergency reception command in a driver (the driver 69) for a device such as the image output section 70, for example. The emergency reception command is stored in an emergency cue executed in priority to a normal cue which stores a normal command. Examples of the emergency reception command include a command for specifying an image output start instruction.

The CPU core 32 operates in accordance with the application 300 to function as an evacuation information generation unit 301, an inter-OS communication control unit 302, an image input control unit 303, an image output control unit 304, an image processing unit 305, a communication control unit 306, and so forth.

The evacuation information generation unit 301 generates the evacuation information 41. The evacuation information 41 is information to be evacuated to the shared memory 4 when the information processing apparatus 1 transitions to the power-saving mode.

As discussed above, supply of power to the second CPU 30 is discontinued upon a transition to the power-saving mode. Thus, information stored in the system memory 31 which is a volatile memory is lost upon a transition to the power-saving mode. The system memory 31 stores an instruction (command) provided from the first CPU 20, for example. However, the command is lost upon a transition to the power-saving mode. That is, a command provided before a transition is made to the power-saving mode is lost when the second OS 3 is restarted along with a return from the power-saving mode to the normal mode.

Thus, the evacuation information generation unit 301 generates the evacuation information 41 which is composed of commands specified by the first CPU 20 as having a high order of priority on the basis of the registered command information 310 stored in the system memory 310, and stores the evacuation information 41 in the shared memory 4 before a transition is made to the power-saving mode.

The inter-OS communication control unit 302 controls communication between the first CPU 20 and the second CPU 30 via the system bus 5.

The image input control unit 303 achieves a scanner function by controlling the image input section 68 via the driver 67. The image input section 68 optically reads a document as image data.

The image output control unit 304 achieves a printer function and a copying function by controlling the image output section 70 via the driver 69. The image output section 70 forms an image on paper for printing through electrophotography, for example.

The image processing unit 305 performs a specified process on the image data acquired from the storage medium 61, the HDD 62, the image input section 68, or the like. Examples of the specified process include a process for changing the format of the image data in accordance with the saving format indicated via the operation display section 66.

The communication control unit 306 achieves a communication function by controlling the communication section 63.

(Configuration of Shared Memory 4)

A volatile semiconductor memory may be used for the shared memory 4, for example. A part of the region of the system memory 21 is assigned as the shared memory 4, for example. The shared memory 4 is not limited to a part of the system memory 21, and may be a volatile or non-volatile semiconductor memory provided independently of the system memory 21. The shared memory 4 is supplied with power even after a transition is made to the power-saving mode to hold the stored content.

(Registration Operation for Command ID Included in Emergency Reception Command Registration Command)

Figure 2:
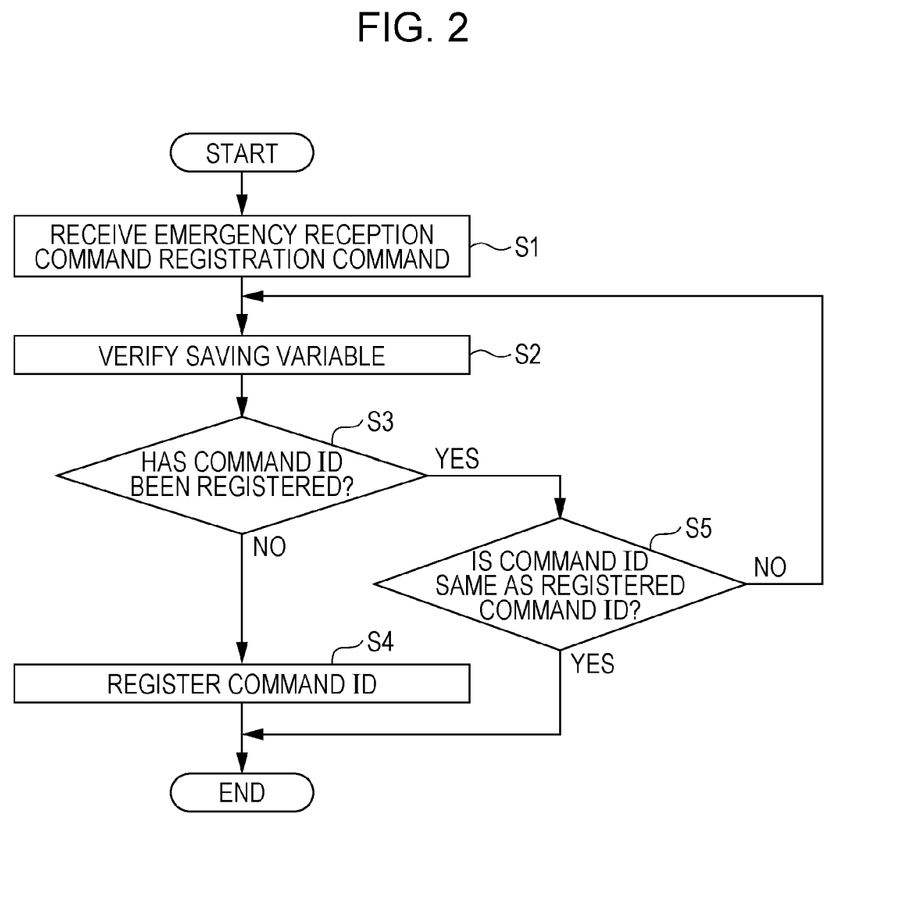
FIG. 2 is a flowchart illustrating an example of registration operation for a command ID based on an emergency reception command registration command for the information processing apparatus according to the exemplary embodiment of the present invention.

An example of operation of the second CPU 30 to register a command ID included in the emergency reception command registration command will be described below with reference to the flowchart of FIG. 2.

The second CPU 30 receives an emergency reception command registration command from the first CPU 20 using inter-OS communication performed by the inter-OS communication control unit 302 (S1). After that, the second CPU 30 verifies a saving variable in order to register the command ID included in the emergency reception command registration command (S2). The saving variable is a variable that indicates a region of the registered command information 310 in which the command ID may be stored, for example. Thus, the command ID is registered in the registered command information 310.

Next, the second CPU 30 determines whether or not a command ID of an emergency reception command, which is registered in accordance with the received emergency reception command registration command, is registered in a region of the system memory 31 corresponding to the verified saving variable (S3). In the case where the command ID has not been registered (S3: No), the command ID is registered in the system memory 31, and the operation is ended (S4). The second CPU 30 may also register a command corresponding to the command ID in the registered command information 310 together with the command ID.

In the case where the command ID has been registered in the region corresponding to the verified saving variable in step S3 (S3: Yes), the second CPU 30 checks whether or not the registered command ID is the same as the command ID included in the emergency reception command registration command (S5).

In the case where the same command ID is registered in the region corresponding to the verified saving variable (S5: Yes), the second CPU 30 ends the registration operation. In the case where a different command ID is registered in the region corresponding to the verified saving variable (S5: No), the second CPU 30 proceeds to step S2 to confirm the next saving variable.

(Operation for Transition to Power-Saving Mode)

Figure 3:
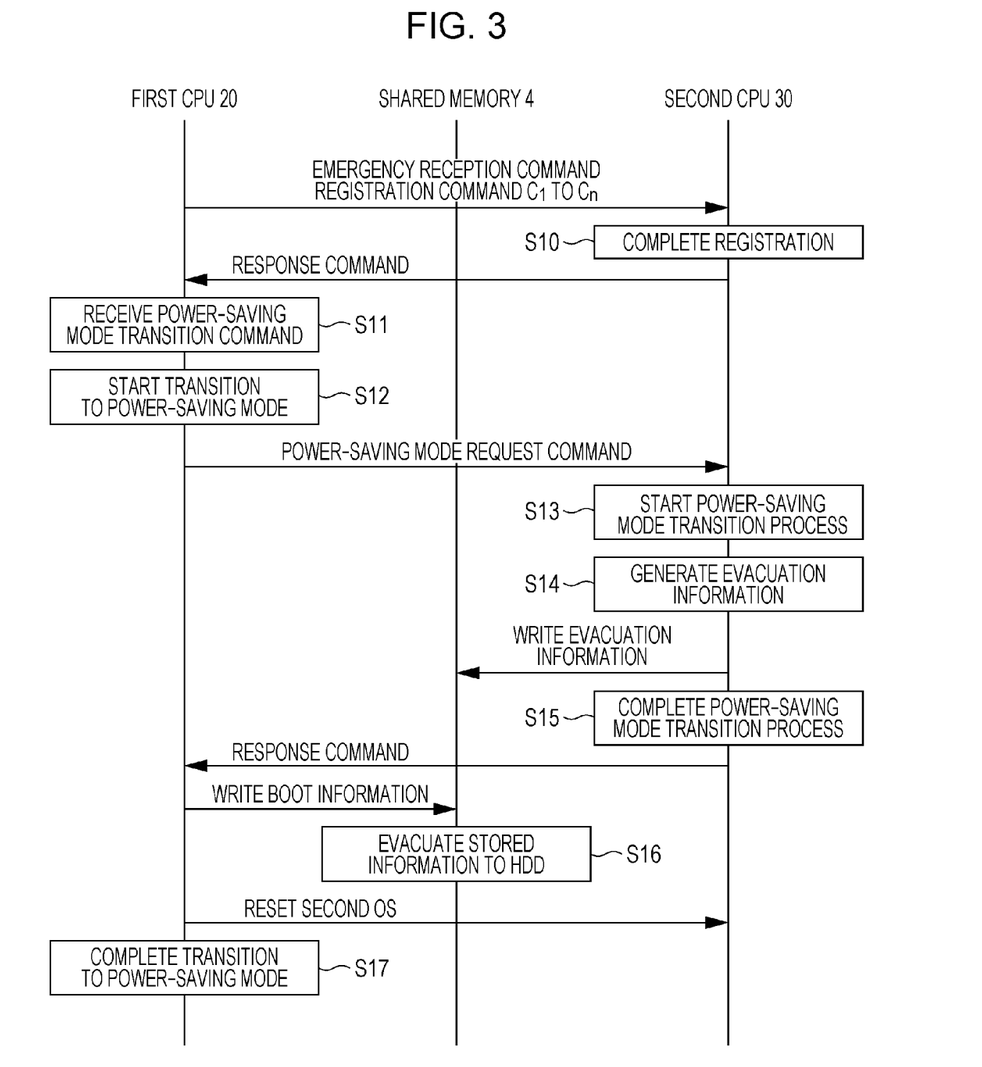
FIG. 3 is a timing chart illustrating an example of operation for transitioning to a power-saving mode for the information processing apparatus according to the exemplary embodiment of the present invention.

Subsequently, an example of operation of the information processing apparatus 1 to transition to the power-saving mode will be described below with reference to the timing chart of FIG. 3. The following description starts from registration operation for a command ID for registering an emergency reception command.

The first CPU 20 of the information processing apparatus 1 transmits command IDs included in emergency reception command registration commands $C_1$ to $C_n$ to the second CPU 30 using the inter-OS communication, and has the command IDs registered in the registered command information 310.

When registration of the command IDs is completed (S10), the second CPU 30 outputs a response command indicating that the registration is completed to the first CPU 20.

When the operator commands a transition to the power-saving mode by operating the operation display section 66, for example, the first CPU 20 receives a command of the operator via the driver 65, the input/output section 64, and the system bus 5 (S11).

The power-saving mode transition unit 201 of the first CPU 20 starts a transition to the power-saving mode on the basis of the received command for a transition to the power-saving mode (S12). Specifically, the power-saving mode transition unit 201 outputs a power-saving mode request command to the second CPU 30.

When the power-saving mode request command is received through the inter-OS communication, the second CPU 30 starts a power-saving mode transition process (S13). Specifically, the evacuation information generation unit 301 of the second CPU 30 generates evacuation information 41 on the basis of the registered command information 310 stored in the system memory 31 on the basis of the power-saving mode request command (S14).

Next, the evacuation information generation unit 301 writes the generated evacuation information 41 into the shared memory 4 via the system bus 5 through the inter-OS communication performed by the inter-OS communication control unit 302.

Next, the second CPU 30 executes processes other than writing of the evacuation information 41 to complete the power-saving mode transition process (S15). The second CPU 30 outputs a response command indicating that the power-saving mode transition process has been completed to the first CPU 20 via the system bus 5 through the inter-OS communication.

Next, when the response command is received, the first CPU 20 writes into the boot information of the state information 40 in the shared memory 4 that a transition has been made to the power-saving mode.

Next, the power-saving mode transition unit 201 of the first CPU 20 evacuates the state information 40 and the evacuation information 41 in the shared memory 4 to the HDD 62 via the system bus 5 and the input/output section 60 (S16). Evacuation of the state information 40 and the evacuation information 41 may be performed with the state information 40 and the evacuation information 41 which have been stored in the shared memory 4 erased or with the state information 40 and the evacuation information 41 left in the shared memory 4.

Next, the power-saving mode transition unit 201 of the first CPU 20 initializes (resets) the second OS 3 and blocks power supply to the second CPU 30 to complete a transition to the power-saving mode (S17).

(Operation for Return from Power-Saving Mode)

Figure 4:
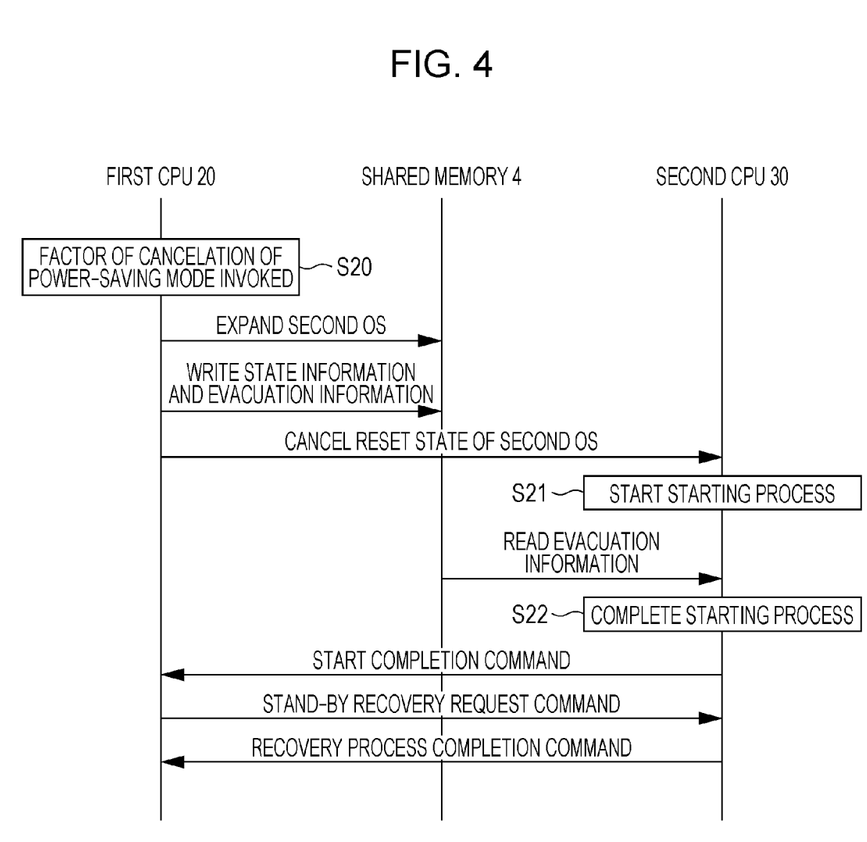
FIG. 4 is a timing chart illustrating an example of operation for returning from the power-saving mode for the information processing apparatus according to the exemplary embodiment of the present invention.

Subsequently, an operation of the information processing apparatus 1 to return from the power-saving mode will be described below with reference to the timing chart of FIG. 4.

When it is determined that a factor of a cancellation of the power-saving mode is invoked (S20), the power-saving mode transition unit 201 of the first CPU 2 expands the second OS image 612 in the storage medium 61 in the shared memory 4. Examples of the factor of a cancellation of the power-saving mode include an operation performed by the operator using the operation display section 66.

Next, the power-saving mode transition unit 201 writes the state information 40 and the evacuation information 41, which have been evacuated to the HDD 62, into the shared memory 4, and cancels the reset state of the second OS 3, that is, starts the second OS 3.

Next, the second CPU 30 starts a starting process for the second OS 3 in accordance with an instruction provided from the power-saving mode transition unit 201 through the inter-OS communication (S21). The second CPU 30 reads the evacuation information 41 written in the shared memory 4 as a part of the starting process. The starting process will be discussed later.

Next, when the starting process is completed (S22), the second CPU 30 transitions to a stand-by state, and transmits a start completion command to the first CPU 20 through the inter-OS communication.

Next, when the start completion command is received, the first CPU 20 transmits a stand-by recovery request command that requests recovery from the stand-by state to the second CPU 30. When the stand-by recovery request command is received through the inter-OS communication, the second CPU 30 starts a process for recovering from the stand-by state. When the recovery process is completed, the second CPU 30 transmits a recovery process completion command indicating that the recovery process is completed to the first CPU 20.

(Starting of Second OS 3)

Figure 5:
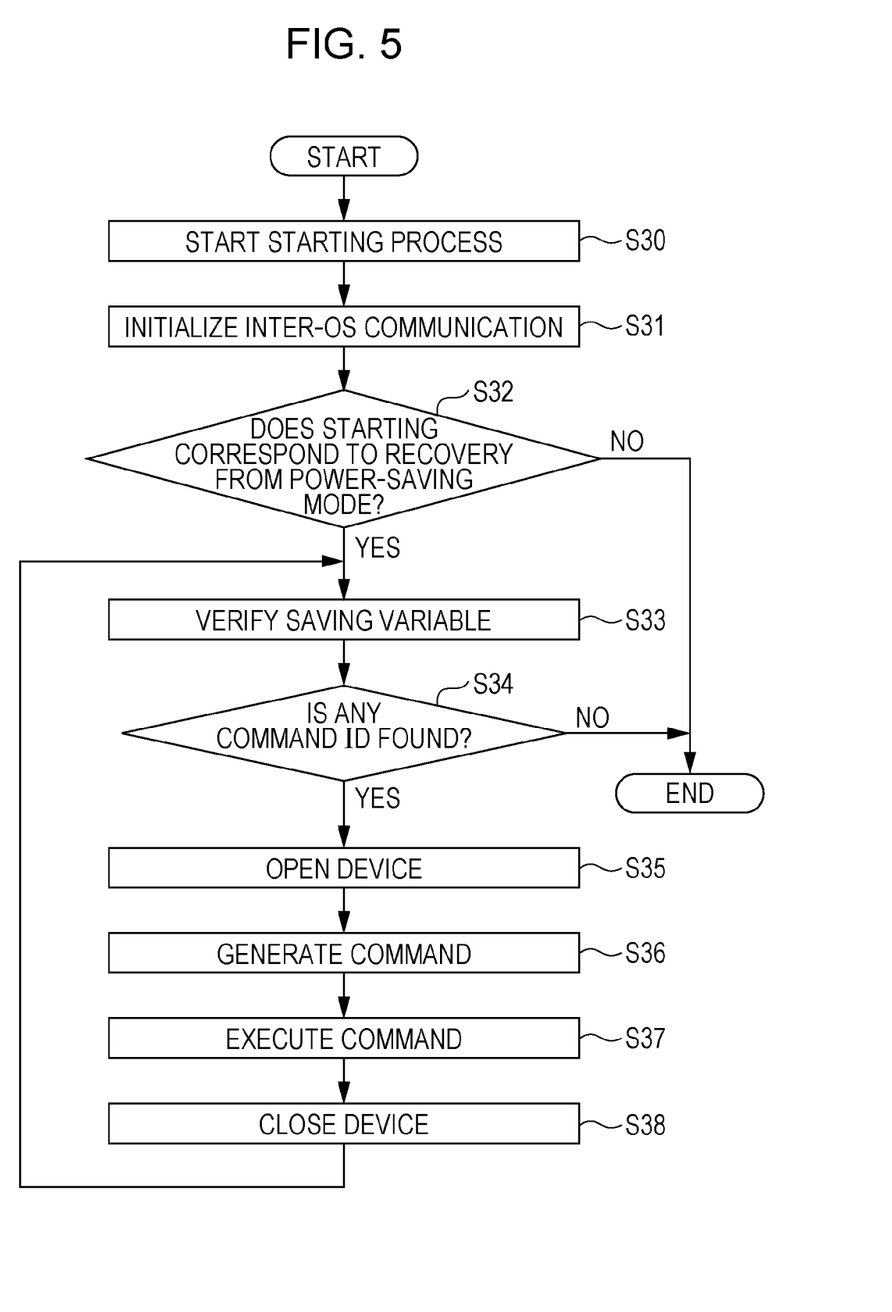
FIG. 5 is a flowchart illustrating an example of starting of the information processing apparatus according to the exemplary embodiment of the present invention.

Subsequently, an example of the starting of the second OS 3 performed by the second CPU 30 will be described below with reference to the flowchart of FIG. 5.

When a factor of a cancellation of the power-saving mode is invoked, the second CPU 30 starts a starting process on the basis of a reset cancellation instruction from the first CPU 20 (S30).

Next, the inter-OS communication control unit 302 of the second CPU 30 initializes the inter-OS communication (S31). After the inter-OS communication is initialized, the second CPU 30 checks the boot information included in the state information 40 in the shared memory 4.

Next, if it is determined on the basis of the boot information whether or not the starting corresponds to recovery from the power-saving mode (S32: Yes), the second CPU 30 reads the evacuation information 41 from the shared memory 4, and generates registered command information 310 on the basis of the read evacuation information 41 to store the registered command information 310 in the system memory 31.

Next, the second CPU 30 verifies a saving variable on the basis of the registered command information 310 (S33).

Next, in the case where any command ID is found in the verified saving variable (S34: Yes), the second CPU 30 starts (opens) a device that registers an emergency reception command corresponding to the found command ID (S35). Examples of the device include the operation display section 66, the image input section 68, and the image output section 70.

Next, the second CPU 30 generates an emergency reception command to be registered in the device (S36).

Next, the second CPU 30 executes the generated emergency reception command (S37). Specifically, the second CPU 30 stores the generated emergency reception command in an emergency cue for the driver 65, 67, or 69 corresponding to the device.

Next, the second CPU 30 closes the device which has been started (S38), and proceeds to step S33 to confirm the next saving variable. The processes in steps S33 to S38 are continuously performed until all the emergency reception commands based on the command IDs stored in the registered command information 310 are executed.

In the case where no command ID is found in step S34 (S34: No), the second CPU 30 ends the process.

[Other Embodiments]

The present invention is not limited to the exemplary embodiment described above, and may be modified in various ways without departing from the scope and spirit of the present invention. In another exemplary embodiment, the information processing program may be provided as stored in a storage medium such as a CD-ROM, or acquired via a network to be executed.

Further, the program used in the exemplary embodiment discussed above may be partially implemented by hardware such as an application specific integrated circuit (ASIC) and a field programmable gate array (FPGA).

While an exemplary embodiment of the present invention has been described above, the exemplary embodiment is merely exemplary, and does not limit the invention according to the claims. Novel exemplary embodiments may be implemented in a variety of other forms, and may be omitted, replaced, modified, etc. in various ways without departing from the scope and spirit of the present invention. In addition, all combinations of the features described in relation to the exemplary embodiment are not necessarily required.

What is claimed is:

1. An information processing apparatus comprising:
a first controller that outputs a transition signal that indicates a transition to a power-saving mode in which power consumption is reduced compared to a normal mode;
a second controller that outputs instruction information that indicates an instruction provided from the first controller before the transition signal is output on a basis of the transition signal output from the first controller, wherein the instruction information includes an instruction specified by the first controller as having a high order of priority, wherein the instruction having the high order of priority includes an emergency reception command registration command for registering an emergency reception command in a driver for a device, and the emergency reception command is stored in an emergency cue executed in priority to a normal cue that stores a normal command; and
a shared memory that is connected to the first controller and the second controller to be shared and that stores the instruction information output from the second controller even after a transition is made to the power-saving mode.

2. The information processing apparatus according to claim 1,
wherein the first controller stores the instruction information stored in the shared memory in a memory at a time of transition to the power-saving mode.

3. The information processing apparatus according to claim 1,
wherein the first controller and the second controller operate on a basis of different operating systems.

4. A non-transitory computer readable medium storing a program causing a computer to execute a process, the process comprising:
outputting a transition signal that indicates a transition to a power-saving mode in which power consumption is reduced compared to a normal mode; and
storing instruction information in a shared memory on a basis of the transition signal output, the instruction information indicating an instruction provided before the transition signal is output, the shared memory holding the stored information even after a transition is made to the power-saving mode, wherein the instruction information includes an instruction specified as having a high order of priority, wherein the instruction having the high order of priority includes an emergency reception command registration command for registering an emergency reception command in a driver for a device, and the emergency reception command is stored in an emergency cue executed in priority to a normal cue that stores a normal command.

5. A non-transitory computer readable medium storing a program causing a computer to execute a process, the process comprising storing instruction information in a shared memory on a basis of a transition signal that is output from a first control unit and that indicates a transition to a power-saving mode in which power consumption is reduced compared to a normal mode, the instruction information indicating an instruction provided before the transition signal is output, wherein the instruction information includes an instruction specified as having a high order of priority, and wherein the instruction having the high order of priority includes an emergency reception command registration command for registering an emergency reception command in a driver for a device, and the emergency reception command is stored in an emergency cue executed in priority to a normal cue that stores a normal command.

6. An information processing method comprising:
outputting a transition signal that indicates a transition to a power-saving mode in which power consumption is reduced compared to a normal mode; and
storing instruction information in a shared memory on a basis of the transition signal output, the instruction information indicating an instruction provided before the transition signal is output, the shared memory holding the stored information even after a transition is made to the power-saving mode, wherein the instruction information includes an instruction specified as having a high order of priority, and wherein the instruction having the high order of priority includes an emergency reception command registration command for registering an emergency reception command in a driver for a device, and the emergency reception command is stored in an emergency cue executed in priority to a normal cue that stores a normal command.

* * * * *